United States Patent [19]
Fletcher et al.

[11] 4,039,000
[45] Aug. 2, 1977

[54] ACCUMULATOR

[76] Inventors: James C. Fletcher, Administrator of the National Aeronautics and Space Administration, with respect to an invention of; James R. Fenwick, Chatsworth; George H. Karigan, Canoga Park, both of Calif.

[21] Appl. No.: 641,802

[22] Filed: Dec. 18, 1975

[51] Int. Cl.² ............................................. F02K 9/02
[52] U.S. Cl. .................................... 137/207; 137/209; 62/55; 60/259
[58] Field of Search ...................... 137/207, 206, 210; 62/55, 51, 45, 50; 60/259; 138/26

[56] References Cited

U.S. PATENT DOCUMENTS

| | | | |
|---|---|---|---|
| 2,539,134 | 1/1951 | Hermanny | 138/26 |
| 3,098,353 | 7/1963 | Abild | 60/259 X |
| 3,114,414 | 12/1963 | Judd | 137/207 X |
| 3,952,765 | 4/1976 | Kimura | 137/207 X |

*Primary Examiner*—Alan Cohan
*Attorney, Agent, or Firm*—L. D. Wofford; John R. Manning

[57] ABSTRACT

An improved accumulator particularly adapted for use in controlling the pressure of a stream of fluid in its liquid phase utilizing the fluid in its gaseous phase. The accumulator is characterized by a shell defining a pressure chamber having an entry throat for a liquid and adapted to be connected in contiguous relation with a selected conduit having a stream of fluid flowing through the conduit in its liquid phase. A pressure and volume stabilization tube, including an array of pressure-relief perforations is projected into the chamber with the perforations disposed adjacent to the entry throat for accommodating a discharge of the fluid, in either gaseous or liquid phases, while a gas inlet and liquid to gas conversion system is provided for the chamber and connected with a source of the fluid for continuously pressurizing the chamber for controlling the pressure of the stream of liquid.

4 Claims, 4 Drawing Figures

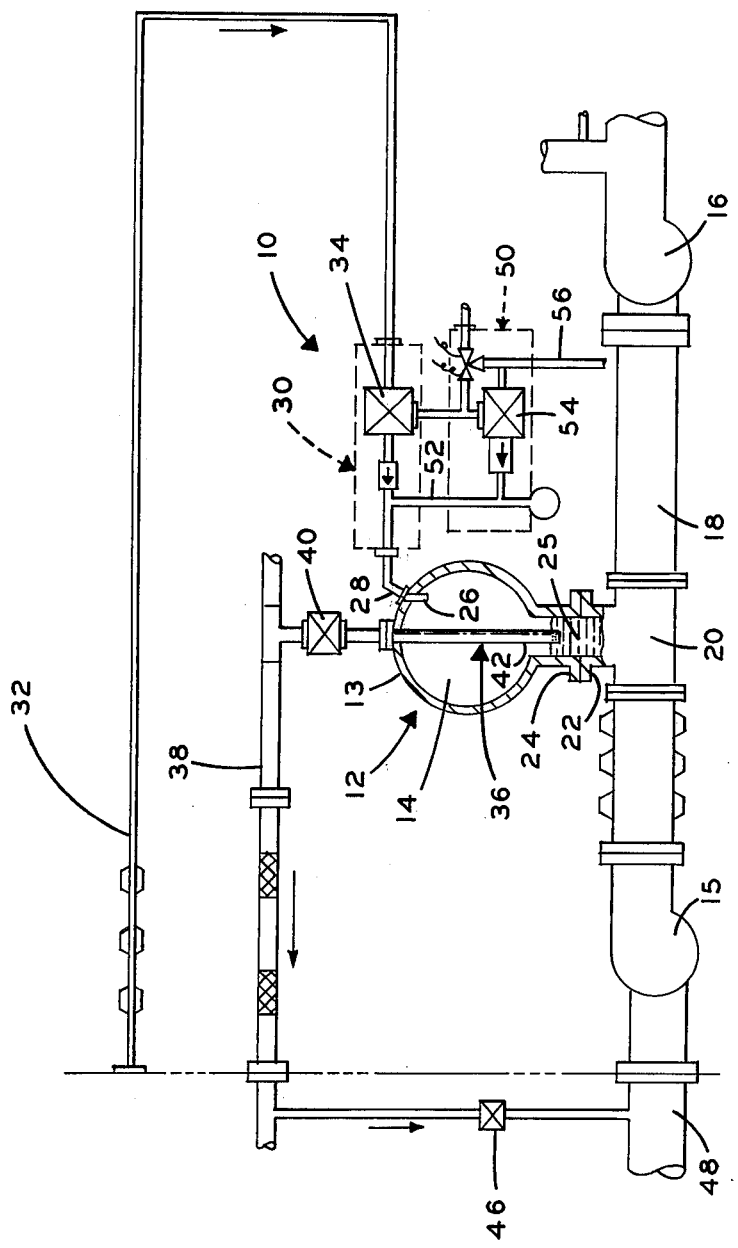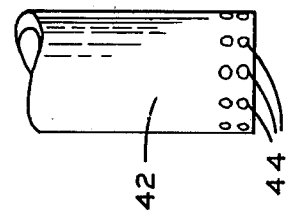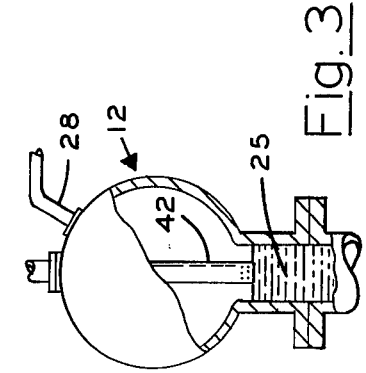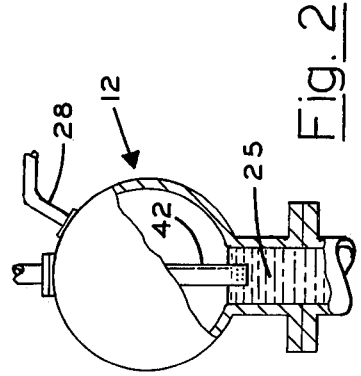

ACCUMULATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention:

The invention generally relates to an improved system for delivering flows of pressurized fluids, and more particularly to a feed system for a rocket engine including an improved cryogenic accumulator.

As can be appreciated by those familiar with the design and operation of vehicles equipped with rocket engines adapted to be used in space, pressure variations often occur in propellant feed systems. Such variations can, in turn, couple with combustion dynamics to produce destructive low frequency, longitudinal oscillations sometimes referred to as POGO, which often impairs vehicle operation.

2. Description of the Prior Art:

Heretofore, it has been common practice to provide feed systems for rocket engines, equipped to utilize liquid fuel/oxidizer propellants, with accumulators for purposes of reducing oscillations in system pressures. Such accumulators often are charged with helium gas for reducing pressure variations in feed systems for the propellants. Of course, such systems necessarily include numerous valves, level control sensors and pressure regulators and large helium tanks which inherently tend to increase weight, costs and complexity and thus reduce payload capabilities. Moreover, it frequently is difficult to precisely predict helium requirements or the effect of helium on downstream components for thus assuring control of liquid oxygen, throughout a mission of an extended duration, utilized as an oxidizer for fuel.

It is, therefore, the general purposes of the instant invention to provide an improved, simplified and reliable accumulator, which is particularly suited for use with the feed systems for rocket engines in overcoming the aforementioned difficulties and disadvantages.

OBJECTS AND SUMMARY OF THE INVENTION

It is, therefore, an object of the instant invention to provide an improved accumulator which overcomes the aforementioned difficulties and disadvantages.

It is another object to provide in combination with a feed system for a rocket engine an improved cryogenic accumulator.

It is another object to provide an improved accumulator for a feed system for a rocket engine including a ventable pressurant adapted to be employed as a propellant for a rocket engine.

It is another object to provide an improved cryogenic accumulator particularly suited for use with the feed system of a rocket engine of the type adapted to utilize liquid oxygen as an oxidizer for fuels which is simple in design, economic to employ, and is controlled passively and substantially automatically.

Another object of the invention is to provide an accumulator which is particularly useful when employed with feed systems for rocket engines, although not necessarily restricted thereto, since the accumulator may be useful when installed in systems other than feed systems for rocket engines.

These and other objects and advantages are achieved through the use of an accumulator which utilizes gaseous oxygen derived from a liquid oxygen supply, such as commonly is found aboard spacecraft, provided for supplying rocket engines. The gaseous oxygen is continuously supplied to the accumulator and vented therefrom at a liquid-gas interface so positioned as to overcome system surge in order to maintain a controlled accumulator gas volume and nearly constant pressure for the oxidizer flowing within the feed system.

BRIEF DESCRIPTION OF THE DRAWINGS

FIG. 1 is a fragmented, partially sectioned schematic view illustrating an accumulator which embodies the principles of the instant invention connected with a feed system for a rocket engine.

FIGS. 2 and 3 comprise partially sectioned views of the accumulator illustrating alternate pressure conditions therefor.

FIG. 4 is an enlarged fragmented view illustrating pressure-relief structure employed for venting fluids in both liquids and gas phases, from the accumulator shown in FIGS. 1, 2 and 3.

DESCRIPTION OF THE PREFERRED EMBODIMENT

Referring now to the drawings wherein like reference characters designate like or corresponding parts throughout the several views, there is shown in FIG. 1 a selected portion of a feed system for a space vehicle, generally designated 10. The feed system 10 includes an accumulator, generaly designated 12, which embodies the principles of the instant invention.

The accumulator 12 preferably includes a pressure-confining shell 13 which defines a plenum chamber 14. It will be appreciated, of course, that the utility of the accumulator 12 is not limited to use with feed systems for rocket engines, however, it has been found that the accumulator has particular utility in controlling the flow of liquid oxygen, since the pressure established within the accumulator is, in operation, vented and the pressurant thereafter employed as an oxidizer. Thus, the operational payload delivery capabilities of a vehicle equipped with the system is substantially enhanced.

As shown, the system 10 includes a low pressure oxidizer pump 15 connected with a source of liquid oxygen, not shown, and a high pressure oxidizer pump 16, connected with an engine, also not shown. Between the pumps 15 and 16, there is extended a liquid oxygen conduit 18. This conduit serves to deliver oxygen in its liquid phase from the low pressure oxidizer pump to the high pressure pump.

Interposed in the conduit 18, between the pumps 15 and 16, there is a T-joint 20 provided with a coupling flange 22 on which is seated the accumulator 12. As a practical matter, the accumulator 12 also includes a flange 24 coaxially aligned with an entry throat 25 for the accumulator. The flange 24 is adapted to be mated in a coaxial face-to-face relationship with the flange 22. Thus, a coupling of the accumulator 12 with the conduit 18 is accommodated. It should therefore, be apparent that as liquid oxygen is forced to flow from the pump 15 to the pump 16 it is subjected to the pressures confined within the chamber 14. The liquid oxygen is forced into the shell 13 through the throat 25 with the level thereof being determined by the pressure of oxygen gas confined in the chamber. Thus, the pressure of the liquid oxygen within the conduit is stabilized for avoiding system surge.

The oxygen gas is delivered to the chamber 14 via a diffuser 26 of a suitable design mounted on the shell 13. The diffuser 26, in turn, is connected through a suitable conduit 28 with an oxygen gas control unit, generally designated 30. This unit, in turn, is fed via a conduit 32 extended from a source of liquid oxygen provided aboard the vehicle and employed as a source of oxidant for the system 10. The control unit 30 is of any suitable design and includes, preferably, an isolation valve 34. The unit 30 serves to convert oxygen fed in its liquid phase, via the conduit 32, to an oxygen gas. This gas is introduced into the chamber 14 by the diffuser 26.

It will, therefore, be appreciated that liquid oxygen fed to the control unit 30, via the conduit 32, is introduced continuously under pressure into the chamber 14 in its gas phase, while oxygen in its liquid phase is delivered to the chamber through the throat 25. A liquid-gas interface is thus established within the chamber 14. Due to the violent agitation of the liquid during flight a means of stabilizing (minimizing sloshing) in the accumulator is desirable. Accordingly, floats and/or baffles for control of the liquid are required to minimize slosh and the resultant condensation of the gaseous oxygen.

In order to assure that the liquid-gas interface remains at a substantially fixed position within the chamber 14 of the accumulator 12 there is provided a pressure-stabilization tube, generally designated 36. This device functions as a pressure-relief vent, liquid level sensor and control and is connected with an oxygen gas recirculating line 38 through an isolation valve 40. The pressure-stabilization tube comprises a tube 42 extended downwardly through the chamber 14. In practice, the tube 42 terminates within the throat 25 and includes a plurality of perforations 44 which serve to establish a venting section, not designated, for the tube. A venting section characterized by as many as twenty perforations disposed longitudinally as well as circumferentially on the tube having a diameter of one-sixteenth inch each has served quite satisfactorily for an accumulator provided for suppressing POGO with an operational feed system for a rocket engine.

It is to be noted that the recirculating line 38 is connected through a suitable isolation valve 46 to a low pressure section of a conduit 48 mounted aboard the vehicle and connected at the inlet side of the low pressure pump 15. Thus oxygen, in both its liquid and gaseous states, vented from the chamber 14 is reintroduced into the system 10 at a low pressure point in the system. Consequently, the pressurant vented from the chamber 14 is subsequently utilized as a propellant.

As a practical matter, during engine start operations, an insufficient quantity of oxygen gas may be present within the chamber 14. Therefore, an auxiliary helium precharge control package, designated 50, is, where so desired, connected with the diffuser 26 through a suitable conduit 52 and employed to initially introduce helium into the chamber 14 until an operative condition is established for the system 10. While various devices can be employed, there is shown in FIG. 1, an isolation valve 54 and conduit 56 through which the package 50 is connected with a source of helium, not shown. Since the precharge control package 50 forms no specific part of the instant invention, a detailed description thereof is omitted in the interest of brevity.

OPERATION

It is believed that in view of the foregoing description, the operation of the device will readily be understood and it will be briefly reviewed at this point.

With the accumulator 12 connected in a system, such as the system 10, operation thereof is initiated by initially charging the accumulator. This is effected by introducing a sufficient quantity of helium into the chamber 14 via the helium control package 50.

Once the system 10 has achieved an operative state, liquid oxygen is delivered to the oxygen gas control unit 30, via the conduit 32 and thence to the diffuser 26 through the conduit 28. Of course, once the system 10 has achieved an operative mode, the low pressure pump 15 serves to establish a standing flow of liquid oxygen which now rises into the throat 25 of the accumulator 12, at a liquid-gas interface, through a distance determined by the pressure of the gas within the chamber 14. In the event the pressure within the chamber 14 is insufficient to prevent the entry of the liquid oxygen into the chamber, the perforations 44 of the tube 42 are inundated, as illustrated in FIG. 2. With the perforations 44 thus inundated, oxygen gas delivered to the chamber 14 is confined within the chamber so that the chamber experiences a rapid increase in pressure. This pressure serves to cause the liquid oxygen to flow through the perforations and thus lower the level of liquid-gas interface downwardly into the throat to an operative position, such as is illustrated in FIG. 1, at which point gas and/or both gas and liquid oxygen are continuously introduced through the perforations 44 to be delivered through the tube 42 to the recirculating line 38, through the isolation valve 40, and thence to the conduit 48, or low pressure point in the system 10.

In view of the foregoing, it should readily be apparent that the accumulator 12 which embodies the principles of the instant invention serves to impart to the system 10 a substantially self-sufficient, highly reliable capability.

Although the invention has been herein shown and described in what is conceived to be the most practical and preferred embodiment, it is recognized that departures may be made therefrom within the scope of the invention, which is not to be limited to the illustrative details disclosed.

We claim:

1. In combination with a feed system for a rocket engine including a liquid oxygen conduit for conducting a flow of liquid oxygen under pressure between a low-pressure point and a high-pressure point in the system, an improved cryogenic accumulator coupled with said conduit for substantially stabilizing the pressure at which the liquid oxygen is conducted, comprising:
   A. a shell defining an accumulator chamber and having a liquid oxygen entry port defined therein;
   B. means connecting said shell to said conduit in a manner such that the chamber is disposed in continuous communication with said conduit via said entry port, whereby pressures established within said chamber continuously are applied to a flow of liquid oxygen within said conduit;
   C. venting means for substantially stabilizing pressures within said chamber including a pressure and gas volume relief tube connected with the low point in said system and projected into said chamber having fluid exit means disposed adjacent to the entry port for accommodating flow of fluid from said chamber into said tube as the pressure within the chamber exceeds the pressure within the tube, whereby a flow of fluid between said chamber and said low-pressure point is established; and D. means for continuously charging said chamber with oxygen gas including a gaseous oxygen inlet connected with a pressurized source of oxygen gas for continuously delivering flow of oxygen gas to said chamber.

2. The accumulator of claim 1 wherein said means for continuously delivering a flow of oxygen gas to said chamber includes a gas diffuser disposed within said chamber.

3. The accumulator of claim 1 wherein said fluid exit means includes an array of perforations formed in the wall of said tube for facilitating passage of both gases and liquids.

4. The accumulator of claim 1 further comprising a precharge system connected with said diffuser including a pressurized source of helium.

* * * * *